United States Patent
Rohrer

[15] 3,688,801
[45] Sept. 5, 1972

[54] METHOD FOR REPLACING GAS MAINS

[72] Inventor: Carl H. Rohrer, 1501 Hale Ave., Ft. Wayne, Ind. 46804

[22] Filed: March 9, 1971

[21] Appl. No.: 122,409

[52] U.S. Cl. ..................................................138/97
[51] Int. Cl. ..............................................F16l 55/18
[58] Field of Search..........................................138/97

[56] References Cited

UNITED STATES PATENTS

| | | | |
|---|---|---|---|
| 3,294,121 | 12/1966 | Powell et al. | 138/97 |
| 3,607,361 | 9/1971 | Hight | 138/97 X |
| 3,618,639 | 11/1971 | Daley | 138/97 |

Primary Examiner—William R. Cline
Attorney—Woodard, Weikart, Emhardt & Naughton

[57] ABSTRACT

Disclosed is a method for economically and quickly replacing sections of deteriorated gas mains by isolating the section to be replaced, inserting in it a replacement section of smaller diameter which carries inflatable bag sealing means bracketing each service line connection to the deteriorated gas main section and which has a normally open, latched closed valve providing communication between the interior of the replacement section and the annular space between the old and replacement main sections and between the bracketing sealing bags. Gas may then be supplied to the replacement section and will reach the service line through the normally open valve and the annular space bracketed by the inflatable bag sealing means. Thus, unless the service line must also be replaced, no direct connection of the service line to the replacement section need be made.

3 Claims, 4 Drawing Figures

PATENTED SEP 5 1972　　　　　　　　　　3,688,801

INVENTOR
CARL H. ROHRER
BY
Woodard, Weikart, Emhardt & Naughton
ATTORNEYS

METHOD FOR REPLACING GAS MAINS

BACKGROUND OF THE INVENTION

Many gas mains used in the supplying gas to urban consumers have been in use for many years. Corrosion, joint leakage because of the introduction of drying natural gas, and various other factors have caused many such gas mains to deteriorate. Various means for detecting and sealing leaks in gas mains and transmission pipes are known in the prior art. One such leak detection or testing apparatus for gas mains is disclosed in my U.S. Pat. No. 3,439,527. Further because of the tendency of cast iron mains to crack or break completely apart, some gas utility companies have stopped the installation of new cast iron pipe and have initiated long range programs to completely replace all of the old cast iron pipe.

In some areas, deterioration of aging gas mains has been so great as to require their replacement rather than repair, and new, more stringent specifications for gas distribution and supply issued by governmental regulating agencies have made replacement, rather than repair, highly desirable or mandatory. Replacement, however, encounters the difficulty that it requires digging of a new trench and other unnecessary expenses such as removing and replacing pavement in addition to lengthy shut down of the gas supply to many consumers. It is known in the prior art to insert a somewhat smaller diameter replacement section of gas main, formed of plastic, into an old gas main section, thereby avoiding the necessity of digging a new trench for the replacement section of the main. Normally these sections are approximately 800 feet long, and to connect the existing service lines into the replacement main, it is necessary to temporarily shut down the gas supply to all of the service lines branching from this replaced section, excavate at all of the service connections (normally, 40 to 45 excavations) and then cut and remove a portion from the old main at each service connection so that transfer of the connection to the new plastic main can be made. This requires that all of some 40 excavations must be open at the same time and all of the group of service connections must be transferred before the new main can be put in service and the gas service can again be resumed to the customers' service lines.

The method and apparatus of the present invention permits insertion of a replacement plastic main section into a gas main and supplying of gas to each service line connected to the old main section without excavating or removing any portion of the old main except at each end of the section of main to be replaced. Where the service lines themselves must also be replaced, either at the time the gas main section is replaced or subsequently, a normally open, latched-closed valve, providing communication between the new gas main section and each of the service lines, may be moved to closed position remotely and the service line junction with the gas main may be excavated, a new service line inserted through and concentric with the old service line, and either a small junctional portion of the old gas main removed, or a hole cut large enough in the old main being replaced so that the service can be connected to the new plastic main without destroying the continuity of the old main which will serve to furnish considerable protection to the plastic main against external damage from driving bar holes to detect possible future leaks or the future use of excavating equipment in vicinity of the main.

DESCRIPTION OF THE METHOD AND APPARATUS

Figure 1:
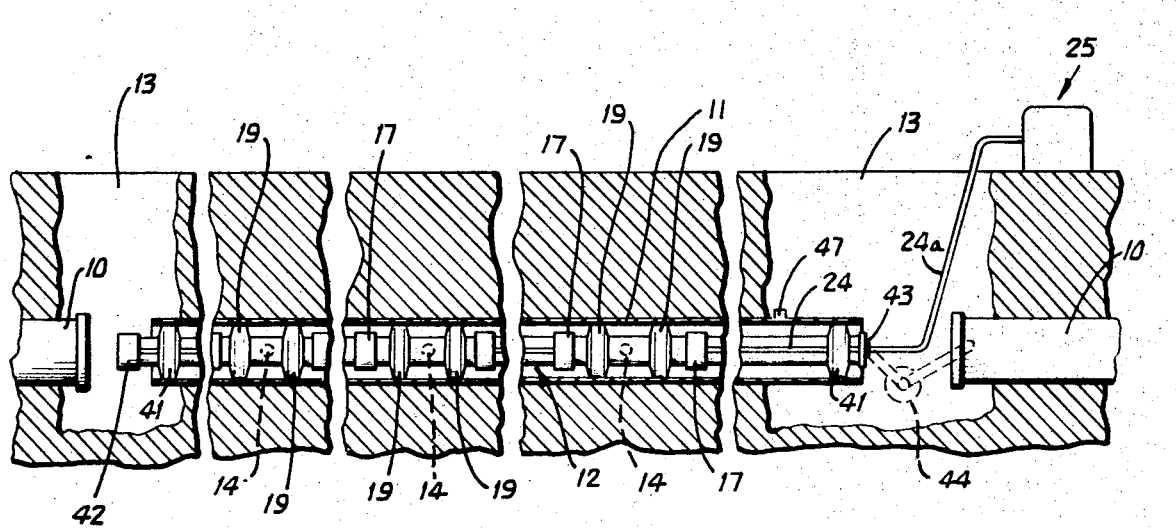
FIG. 1 is a side sectional view of a gas main section to be replaced with the replacement section positioned therein.

Referring initially to FIG. 1, there is shown a gas main 10 having a section 11 which has deteriorated, or which must be replaced for other reasons, and is to have inserted in it a replacement section 12 which is preferably formed of a plastic material but might be formed of steel or similar material.

The section 11 is shown isolated from the main 10 and this is done by initially making the excavations at each end of the section, indicated at 13, and capping the remaining portions of the main. Since the gas main is supplied at various locations along its length, the capped remainder of the gas main, except for the section 11, remains pressurized and customer service is not interrupted in this area. At the initiation of the process for replacing the gas main section, a pressure regulator is placed at the customer's meter at the far end of the service lines 14 which branch from the gas main section 11. These regulators have a capacity such that an increase in gas supply pressure in the replacement section of the main will not affect the provision of gas at proper pressure to the customer's furnace and appliances supplied through the service line.

The gas main section 11 to be replaced might have a length of approximately 800 feet or more and when the interior of this section 11 is accessible, its interior may be cleaned by the use of conventional polyurethane pigs and tested as described in my aforementioned U.S. Pat. No. 3,439,527. This permits location and replacement of any service lines found leaking before inserting the replacement section. This also makes it possible to locate each service connection precisely. The replacement section indicated generally at 12 is now tested for leaks in accord with governmental agency requirements. While the plastic pipe is being tested, the valve 27, to be subsequently described must be temporarily locked closed.

Figure 2:
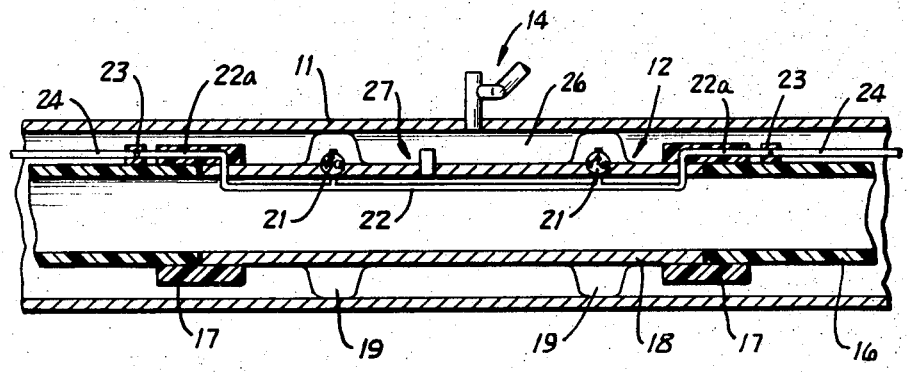
FIG. 2 in an enlarged, fragmentary sectional view of the replacement gas main section shown in FIG. 1.

This replacement section is shown in detail in FIG. 2 and is preferably made up of a series of joined, alternating plastic and steel sub-sections, the length of the total section being whatever is required to coextend with the section 11 to be replaced. Pipe sections 16, which may be formed of plastic, are joined by means of transition coupling sleeves 17 to the steel pipe section 18. The transition couplings are conventionally made of polyethylene and are factory fused to the steel pipe 18 and are heat fused to the plastic pipe 16 in the field by conventional methods. The steel pipe sections 18 carry sealing means taking the form of inflatable bags 19 which extend annularly around the exterior surface of the steel pipe sections 18. The bags 19 are placed on the pipe sections 18 so that they are spaced sufficiently to bracket each service line branch 14. Inflation of the bags 19 is provided for by the check valves 21 at each bag. The check valves receiving a supply of inflating fluid through the tube 22 which extends interiorly of the pipe section 18. The tube 22 is connected to a passage 22a in each of the couplings 17 and is connected by means of a coupling 23 to a tube 24 which extends along the exterior of each of the plastic pipe sections 16. The use of the check valves 21 is dependent upon the type of fluid used to inflate the bags 19. Thus, if a two-part solidifying fluid is used to inflate the bags, the catalyst component might be placed in the bags before the replacement section is inserted into the gas main and the tubes 22, 22a and 24 might carry to the bags the remaining liquid component of the solidifying fluid so that after introduction of the liquid into the bags the two components would mix and harden into a solid mass giving a permanent seal between the replacement pipe section and the inner surface of the gas main 11 providing an annular sealed chamber 26 adjacent the service line 14. As shown in FIG. 1 line 24a, communicating with the tube 24, may be connected to a source of pressurized fluid for inflating the bags 19, such a fluid source being indicated schematically at 25. As an alternate method, the component parts of the fluid may be mixed thoroughly at the source 25 in such proportions that it will not harden instantly but will harden and cure in the bags, the time of curing being determined by the proportions of catalyst and liquid used as is well known. In this alternate method the liquid would also harden in the tubes and help retain the pressure in the bags 19. Another alternate method is to use natural gas to inflate the bags 19 and keep them inflated by means of a small, external compressor and pressure tank until all of the services are reconnected by removing a small piece of the old main as described subsequently, and then sealing the annular space 26 between the new, inserted main 12 and the old main 11 on each side of the service connection 14 with cement, plastic foam or other suitable material so that if the inflatable bag 19 should deflate, and in the event of a leak in the plastic pipe 12 the distance the gas could travel in the annular space 26 would be limited by the distance between service connections.

Figure 3:
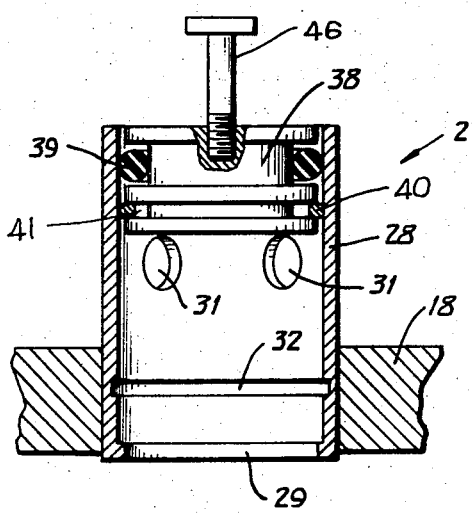
FIG. 3 is an enlarged, side sectional view of the normally open valve, or check valve, shown in FIG. 2.

Communication between the interior of the replacement pipe section 12 and the sealed annular space 26 is preferably provided by means of a valve 27. As may best be seen in FIG. 3 where this valve is shown in detail, the valve is indicated as being composed of a tubular body 28, open at its lower end to provide an inlet aperture 29, the body being secured in an appropriate aperture in the wall of the steel pipe section 18 which forms a component of the replacement main section 12. Equally spaced and aligned around the circumference of the body 28 are apertures 31 which form an outlet for the valve. Intermediate the inlet aperture 29 and the outlet apertures 31, the body 28 is provided with an internal, locking groove identified at 32. Slidable within the body 28 is a piston 38 carrying a conventional O-ring 39 which functions to provide a dynamic and static seal between the piston and the adjacent inner surface of the valve body 28. The piston is also provided with an annular groove 41 in which is accommodated a conventional, resilient snap-ring 40 which is semi-circular in configuration and which is adapted to expand into the groove 32 when the piston has been moved so as to align the snap-ring 40 with the groove. When the piston has been moved so that the ring 40 snaps in the groove 32, the piston will be disposed below (as viewed in FIG. 3) the outlet apertures 31 and the valve will be closed, that is, communication between the inlet 29 and the outlet 31 will be blocked. The piston 38 is moved so as to close the valve by the application of a high pressure pulse against the working face 38a of the piston. This closing action upon the application of a high pressure pulse against face 38a of piston 38 occurs because the area of face 38a is larger than the combined areas of apertures 31.

Figure 4:
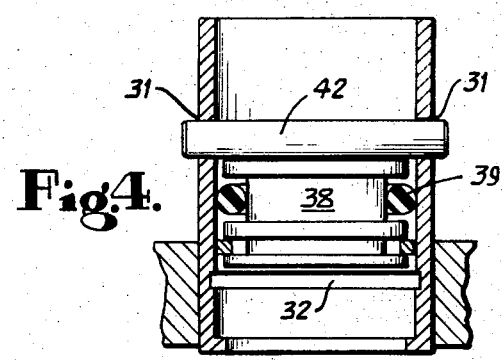
FIG. 4 is an enlarged, side sectional view of the valve shown in FIG. 2 in a temporarily closed, test position.

As mentioned above, governmental body regulations require that replacement section 12 be tested before insertion and for such testing the valve 27 must be locked, temporarily, in closed position. The means for accomplishing this is shown in FIG. 4. Since the working face 38a of the piston 38 is manually accessible prior to insertion of replacement section 12, it may be manually moved to its position shown in FIG. 4, a position below the apertures 31, and a steel pin 42 temporarily pushed through a registering pair of the apertures 31 to lock the piston in place. The piston 31, in this test position, is not low enough (as viewed in FIG. 4) to permit snap ring 40 to enter groove 32 so that, after testing, pin 42 may be removed and the piston 38 moved back to its position of FIG. 3. This return positioning of the piston is accomplished by screwing the handle member 46 into a tapped aperture in the piston face, pulling the piston to its position of FIG. 3, and then removing member 46. The replacement section 12, with valves 27 in place is then ready for insertion into the old main 11. With replacement pipe section 12 tested and inserted into section 11 to be replaced and the bags 19 still deflated, the ends of the section 11 may be sealed by locally inflating the inflatable sealing bags 41 at each end of the inserted assembly. After the annular space between the sections 11 and 12 is sealed by inflating bags 41, or by any other suitable means, an inert gas such as nitrogen, carbon dioxide or the like may be introduced into the space between main sections 11 and 12 through one of the threaded fittings 47 (FIG. 1), the other of the fittings being left open until the space is purged of air. The fittings 47 are thereupon capped retaining the inert gas within the annular space. With the ends of the inserted section 12 capped as indicated at 42 and 43, the replacement tube section 12 may be connected to a source of pressurized gas supply (indicated schematically at 44 in FIG. 1) and gas pressure may thereby be established in the replacement section and in the service line branches extending from the gas main section 11. As will be evident from FIG. 2, gas enters the service lines 14 through the open valve 27 and through the annular space 26 which is sealed closely adjacent to and on both sides of each of the service lines by the inflated bags 19. Gas is thus established to the service lines through the replacement section 12 without excavating and reconnection each service line to the portion 18 of the replacement section 12. The nitrogen is then purged from chamber 26 and the customers appliances relighted. The inert gas is not disturbed or removed in the annular space between sections 11 and 12 beyond sealed chamber 26. This prevents a possible formation of an explosive mixture in this unused annular space in the event of a leak in the plastic or the sealing bags 19. The inserted section 12 may be long enough to bracket merely a single service line 14 or several, as is shown in FIG. 1, the length of the assembly of components forming the inserted replacement section 12 being long enough only to be coextensive with the length of gas main section 11 which needs replacement. If additional portions of the gas main 10 are to be replaced, the operation is repeated and the cap 42 may be removed from the adjacent ends of the inserted sections 12 and they may be joined together.

If one or more of the service lines 14 must also be replaced, the further step is carried out, that of applying sufficient inert gas pressure in the service line at the gas meter end of the service line, after first disconnecting it from the meter, this pressurizing of the service lines serving to move the piston 38a of that valve 27 adjacent the particular service line involved so that the valve is closed. This isolates the chamber 26 and the service line 14 from the gas supply within the replacement section 12. An excavation may then be made at the junction of the service line and the gas main 11 and a portion of the main 11 at the service line junction can be removed. A replacement section of service line, of a diameter smaller than the original service line, may then be inserted into the original service line. The replacement inner service line section can then be connected, by conventional means, at one end to the adjacent portion of the replacement section 12 and at its other end to the customer's meter. It should be noted that closure of the valve 27 before removal of the adjacent portion of the gas main 11 permits this removal in an area free of gas pressure because of the blocking of communication between the interior of the section 12 and the chamber 26. All of the series of service lines branching from a section of the gas main may thus be renewed one at a time, without shutting down service to other customers while the renewal is taking place. It will be understood that it would also be possible to place the bags 19 at a distance apart so as to bracket more than one of the service line branches so that more than one branch could be renewed at the same time.

I claim:

1. A method for replacing deteriorated sub-surface gas mains of the type having service lines connected at spaced locations along the gas main, said method including: initially excavating at each end of a predetermined length section of the main and isolating said section from the remainder of the gas main, then inserting within said main section a generally coextensive section of smaller-diameter replacement tube having disposed on its exterior surface inflatable sealing means bracketing at least one of the service line to gas main junctions and a normally open valve providing communication between the interior of said tube section and said junction, subsequently inflating said inflatable sealing means to isolate each service line to gas main junctional area, and finally connecting said tube section to a source of pressurized gas supply to establish gas pressure in said service line.

2. The method claimed in claim 1 but modified by said normally-open valve being latched closed by application of a predetermined pressure to its downstream side and said method having the additional steps: applying pressure at the meter end of said service line to latch closed said normally open valve, then exposing and removing the portions of said gas main section and of said service line at their common junction, and subsequently inserting a replacement length of service line through the original service line and connecting said replacement length of service line to said replacement tube section.

3. The method claimed in claim 1 in which said inflatable sealing means on said replacement tube section takes the form of inflatable bags and which are inflated by introducing into them a fluid which subsequently solidifies sufficiently to provide a permanent durable seal around each service line to gas main junctional area.

* * * * *